Figure 1:
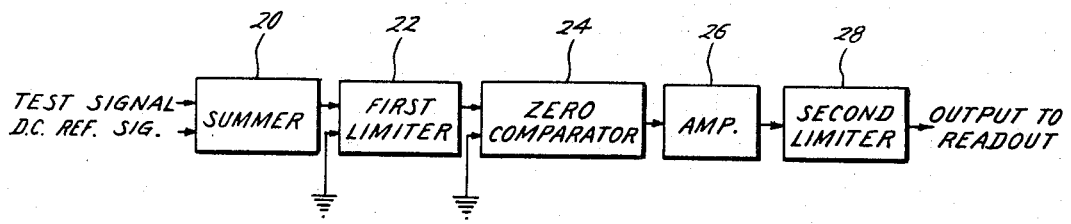

April 2, 1968            P. L. RICHMAN            3,376,513

HIGH PRECISION COMPARATOR DEVICE

Original Filed Jan. 2, 1963            3 Sheets-Sheet 1

Peter L. Richman
INVENTOR.

BY Michael P. Breston

ATTORNEY

April 2, 1968 P. L. RICHMAN 3,376,513
HIGH PRECISION COMPARATOR DEVICE
Original Filed Jan. 2, 1963 3 Sheets-Sheet 2
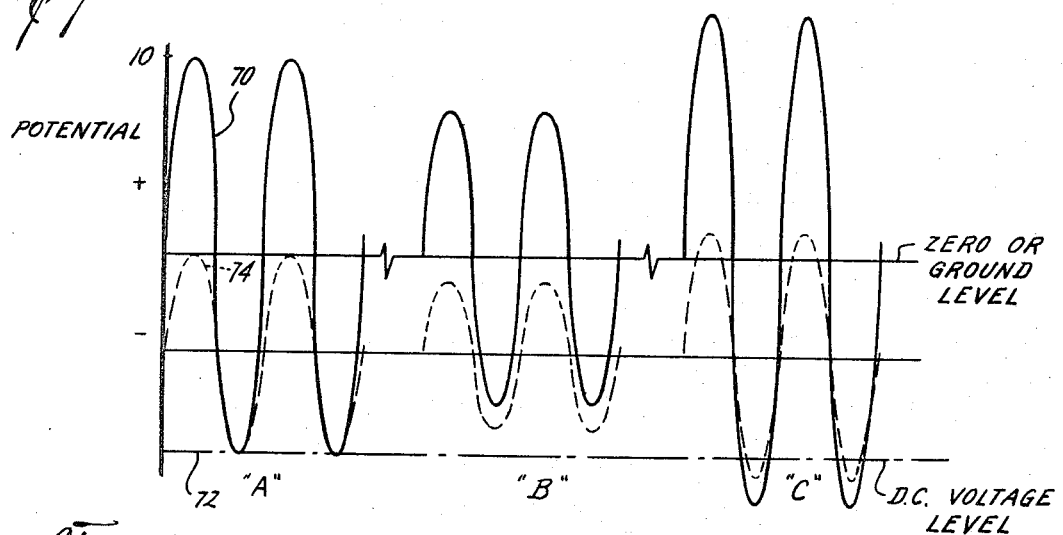
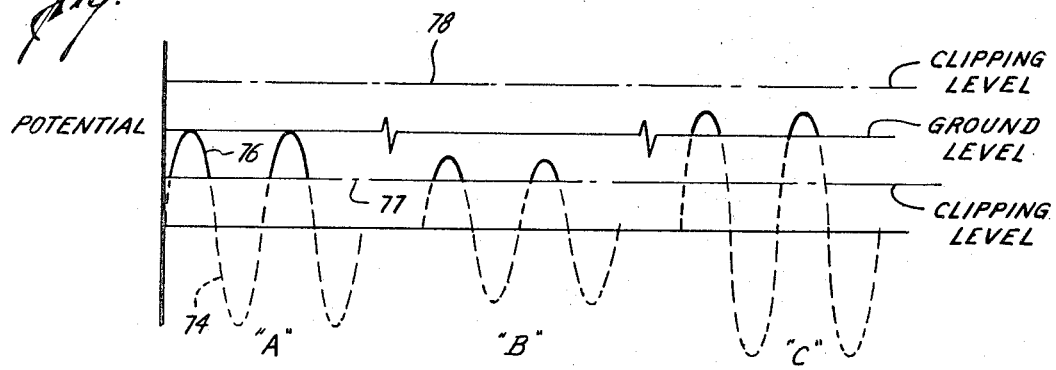
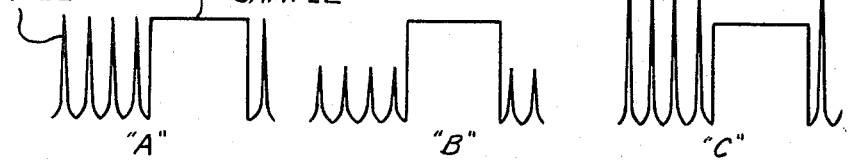
Peter L. Richman
INVENTOR.
BY Michael P. Breston
ATTORNEY April 2, 1968    P. L. RICHMAN    3,376,513
HIGH PRECISION COMPARATOR DEVICE
Original Filed Jan. 2, 1963    3 Sheets-Sheet 3
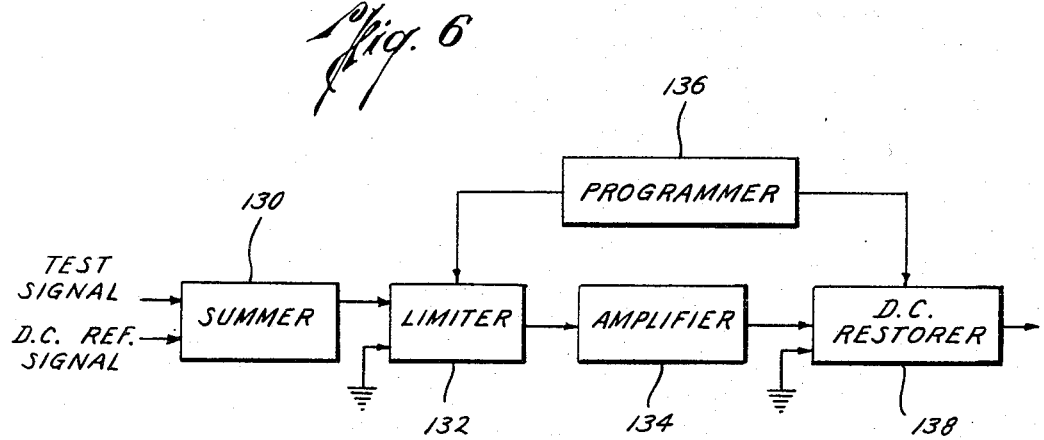
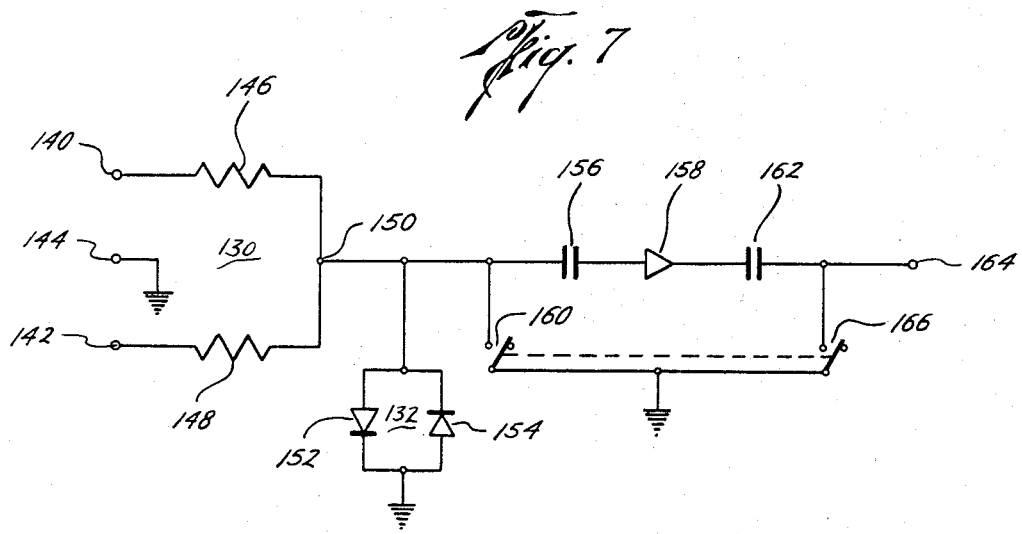
Peter L. Richman
INVENTOR.
BY Michael P. Breston
ATTORNEY 3,376,513
Patented Apr. 2, 1968

3,376,513
HIGH PRECISION COMPARATOR DEVICE
Peter L. Richman, Lexington, Mass., assignor, by mesne assignments, to Weston Instruments, Inc., Newark, N.J., a corporation of Delaware
Original application Jan. 2, 1963, Ser. No. 248,956, now Patent No. 3,195,054, dated July 13, 1965. Divided and this application Mar. 18, 1965, Ser. No. 440,874
4 Claims. (Cl. 328—151)

This invention relates to signal comparators and more particularly to comparators by which the amplitude of a test signal is compared with the amplitude of a reference signal. This application is a divisional application of my co-pending application, Ser. No. 248,956 and now Patent No. 3,195,054.

In order to test the performance of a circuit or instrument, it is conventional to analyze output voltage or current signals as by comparing the amplitudes of the output signals with the amplitude of a reference voltage or current.

For visual analysis the results of this comparison are generally displayed on the face of an indicating instrument such as a cathode ray oscilloscope. A number of circuits have heretofore been proposed for accepting a test signal and a reference signal in order to produce an output signal having an amplitude which is proportional to the difference between the signals' amplitudes. Many of these proposed devices have used low frequency choppers. But, when it is desirable to know the sense as well as the magnitude of the difference between the signals' amplitudes, multiple synchronized choppers were employed rendering the circuits expensive, complex and of poor accuracy.

In high precision comparators, it is often desired to perform the comparison with an accuracy within a few thousandths of a percent of the test signals' amplitude. It will be appreciated that if the entire test signal were applied to one input of an oscilloscope, the minute difference between the signals' amplitudes would not become readily apparent. Although the resolution of the oscilloscope can be increased as by changing scales, the scale change will cause the oscilloscope to become severely overloaded. Not only are oscilloscopes subject to becoming overloaded but they are also subject to drift. The latter is generally a source of substantial error especially when dealing with precisions required for laboratory standards.

It is therefore the main object of this invention to provide new and improved comparators for making high precision comparisons between the amplitude of a test signal and the amplitude of a reference signal.

It is another object of this invention to provide a new and improved comparator which is stable, simple and reliable in operation.

It is a further object of this invention to provide a new and improved comparator for providing a difference signal which is the limited sum of a test signal and of a reference signal, the limited sum signal falling within a predetermined range on either or both sides of a fixed reference plane potential.

Figure 2:
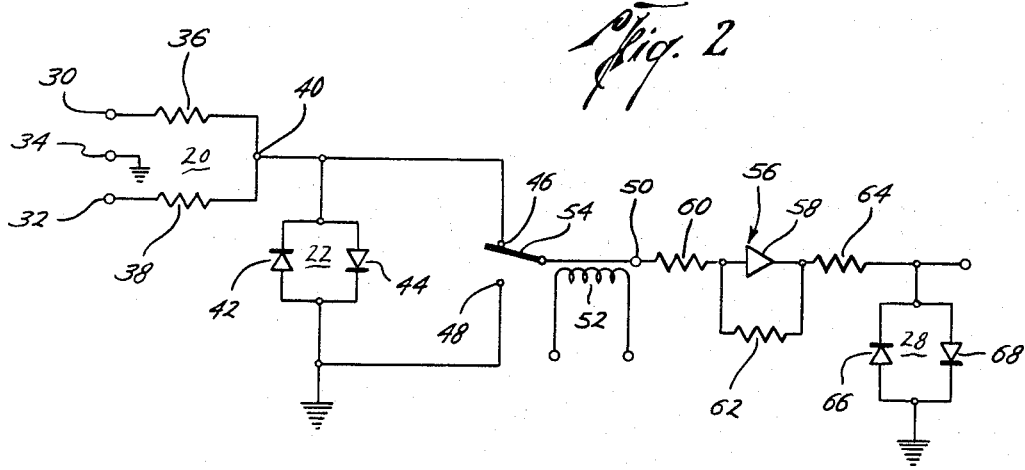

Other objects of the present invention will become apparent from the following description, especially when taken in connection with the accompanying drawings in which:

FIG. 1 is a known block diagram of a comparator;
FIG. 2 is a schematic circuit diagram of the embodiment shown in FIG. 1;
FIGS. 3, 4 and 5 are graphs of waveforms representing input and output signals in the embodiment shown in FIG. 2;
FIG. 6 is a preferred embodiment in block diagram form of this invention; and
FIG. 7 is a schematic circuit diagram of one form of the embodiment of FIG. 6.

Generally, the present invention is a device for generating, from a datum signal and a reference signal, a comparison waveform having predetermined characteristics for presentation to a readout device such as an oscilloscope. The waveform comprises a pair of alternately recurring sections. One of the sections is formed from a ground level signal which is common ground to both the datum and reference signals. The other of these sections is formed from an error signal derived from the limited sum of said datum and reference signals. In order to derive the desired final waveform, preferably four processes are basically performed by appropriate means, the datum and reference signals are individually or as a sum, limited or not, sampled or compared to a common ground; the datum and reference signals are summed either before or after comparison with ground; the sum of the datum and reference signals is limited to a predetermined level at least on one side of ground; and at some stage the datum and reference signals are amplified, either as the sum alone or as the limited sum. It will therefore be seen that although operations can occur in various order, limitation always follows summation in time.

Referring now to the embodiment shown in FIG. 1 there is provided a summing means 20, adapted to accept a pair of inputs consisting of a reference voltage and a datum voltage, for summing the two. The datum voltage is, for example, an AC signal. Summing means 20 is connected to a first limiting means 22 for extracting that part of the summed waveform which contains information relating to the difference between the two input voltages. In this embodiment this is done by clipping the summed waveform between predetermined levels on either or both sides of a zero or ground potential, and for this reason, the limiting means is shown as having a grounded input. Limiting means 22 is connected with one of two inputs to a zero comparator or chopper 24. The other input of chopper 24 is maintained at ground potential. The zero comparator is a low frequency periodic switch having an output which is connectable in sequence between the two inputs. Thus the output of chopper 24 is a periodic potential or second waveform constituted of the clipped portion of the summed waveform and the ground potential in time-alternate sections. In a preferred embodiment, amplifying means 26 are included for accurately amplifying the second waveform in order to provide better resolution between the peak amplitudes of the alternate sections of the second waveform. The potential resolution without overload in the readout device is still further increased by second limiting means 28 for clipping the amplifier output before presentation to a read-out instrument.

Referring now to FIG. 2 there will be seen a schematic circuit diagram embodying the principles of the embodiment heretofore disclosed. The circuit includes a pair of input terminals 30 and 32 and a common ground 34. The datum signal intended to be examined is impressed between ground terminal 34 and one of terminals 30 and 32. A precision DC reference source is applied between ground and the other of terminals 30 and 32. It will be apparent that because it is primarily intended to provide a precision comparison, as for calibration purposes, the peak value of the input datum voltage will be approximately known; thus the reference voltage can be so selected as to be nearly equal to the datum voltage peak level. Terminals 30 and 32 therefore constitute the input terminals to the summing means. This means, in the form shown in FIG. 2, comprises a resistive network including a pair of resistors 36 and 38. One side of resistor 36 is connected in series to terminal 30, and one side of resistor 38 is connected in series to terminal 32. The other sides of the resistors are connected to one another, as at summing junction 40. The two input signals can be said to be parallel to one another inasmuch as they are both connected to a common ground.

It is possible to connect the inputs to the summing means in other ways. For instance, the datum voltage source may have one side grounded and the other side connected to one polarity of the DC reference, the other pole of the reference being coupled via a series resistor to the input of the first limiter. In such an arrangement, the DC reference voltage is floating with respect to ground. Thus, it becomes difficult to accurately check or calibrate the DC source during operation of the invention.

Alternatively, one side of the DC source may be grounded while the other side is connected to one side of the datum voltage source, the other side of the datum voltage source being applied to the input terminal of the first limiting means through a series resistance. This arrangement floats the datum voltage source with respect to ground. Where the datum voltage source, for instance, is derived from a transformer, the floating of the datum voltage may tend to introduce stray capacitive effects.

With the preferred arrangement of inputs in parallel as shown in FIG. 2, neither voltage source is floating. Hence, stray capacitive effects are minimized and the DC reference source can readily be checked without adverse effect during operation of the invention.

In the embodiment shown in FIG. 2, the summing means comprises a resistive network in which resistors 36 and 38 preferably are equal to one another within a ratio error of less than 0.003% or better. The accuracy with which the comparison of the two input voltages is to be made is limited to a first order by the precision with which these two resistors can be matched and limited only to a second order by the other electronic components of the circuit. In practice, it has been found that a resistive pair can be obtained with a ratio error of 300 microvolts out of 10 volts (referred to the input) over a full 0° to 52° C. rated temperature range and through a period well exceeding one year.

Summing junction 40 is coupled to one input of first limiting means 22 which in the form shown comprises a pair of diodes 42 and 44 in parallel. The diodes are disposed back-to-back, i.e., the anode of one diode and the cathode of the other are connected to each other and to junction 40. The cathode of the one diode and the anode of the other are similarly connected to each other and to ground. The provision of a passive limiting means of this type ensures minimization of transients and therefore contributes to the precision operation of the invention. For example, these diodes are high-speed (4 milli-micro-second-recovery) low-capacitance, silicon mesa diodes. The inherent semiconductor breakdown potential provides the outside limits within which the limiting means is operative. The provision of a diode pair in the limiting means allows the latter to clip the wave peaks regardless of the polarities of the signals fed to the summing means. However, with the proper choice of signal polarities, the limiting means need include but one diode appropriately poled.

The zero comparator of the embodiment of FIG. 1 is shown in FIG. 2 as a conventional chopper having a pair of input terminals 46 and 48 and an output terminal 50. One of the input terminals, for instance terminal 48, is connected to ground; the other input terminal, in this instance terminal 46, is connected to the underground side of diodes 42 and 44, as at junction 40. The chopper is preferably any low-frequency, low noise, periodic switch in which the alternate connections between input terminals 46 and 48 to output terminal 50 is of the "make-before-break" type to avoid the introduction of transients.

The zero comparator includes the usual coil 52 for driving chopper armature 54 at a predetermined switching rate.

Output terminal 50 of the zero comparator is in turn connected to the input of amplifier means which, in FIG. 2, comprises chopper-stabilized operational amplifier 56.

Typically, operational amplifiers are direct-coupled, high-gain, chopper-stabilized negative feedback stabilized amplifiers with wide band-pass characteristics. In the example shown, operational amplifier 56 comprises a very high-gain amplifier stage 58, i.e., one having for instance a gain of many thousand, an impedance or series resistor 60 and a feedback resistor 62. The latter is connected between another summing junction (which lies at the input to amplifier stage 58) and the output of the amplifier stage. The overall gain of such an operational amplifier, because of the virtual ground at the summing junction is then determined by the ratio of the values of resistor 62 to resistor 60. It will be apparent to those skilled in the art that the reason for using an operational amplifier is to provide the relatively distortion-free, stable amplification desired in precision instruments, and particularly to obtain wide-band amplification while maintaining DC integrity. Other amplifier devices, capable of meeting these criteria, may also be employed. The output of the amplifier is connected to one side of load resistor 64. The other side of the load resistor is in turn connected to the input of second limiting means 28. The latter means is similar to the first limiting means and thus may comprise a pair of diodes 66 and 68 in parallel, the anode of one diode and the cathode of the other being connected to the other side of load resistor 64, while the cathode of the one diode and the anode of the other are in turn connected to ground. If the polarities of the input signals to the invention can be selected, then limiting means 28, like limiting means 22, can be formed of but a single diode appropriately poled.

The operation of the embodiment of FIGS. 1 and 2 can be described in connection with exemplary values. For instance, assuming that a sinusoidal AC waveform (shown as 70 in FIG. 3A) of approximately 10 volts peak value is applied across terminals 30 and 34 and a DC voltage level (shown as 72 in FIG. 3A) of precisely 10 volts is similarly applied across terminals 32 and 34, the resistive network of parallel resistors 36 and 38 will sum these voltages. The summed waveform 74 appears at junction 40 reduced in overall amplitude due to the inherent attenuation characteristics of the resistive network.

Summed waveform 74 is applied to limiting means 22. Because with a two diode limiter the anode of diode 42 and cathode of diode 44 are both grounded, waveform 74 as shown in FIG. 4A (wherein the extent of deviation of waveform 74 from ground is exaggerated for the sake of clarity) will be limited or clipped within an amplitude range defined by two clipping levels 77 and 78 extending respectively on opposite sides of the ground level. Where the limiter includes but a single diode, the clipping need be only on that side of ground at which the bulk of the summed waveform appears. The value of the levels is established by the breakdown voltage of the diodes. For instance, with diodes as hereinbefore described the levels lie within limits of 0.7 volt on either side of ground, this valve being a typical breakdown voltage. Hence, the maximum voltage passed by limiting means 22 in such case is about 1.4 volts, the vast bulk of which will lie within a 0.7 volt range on one side of ground. The only portion of waveform 74 passed by the limiting means is then that portion indicated at 76 bearing the information relating to the difference between the value of the DC reference voltage level 72 and the peak values of waveform 70. These latter portions may be termed the error signal. The limiting means not only serves to eliminate the portion of waveform 74 extraneous to the comparison, but the portion which would also introduce difficulties in subsequent amplification of the error signal in view of the overloading effect that large amplitude components would have on the following amplifier. Any limiting means of similar performance can be employed in like manner, although passive limiters are preferred.

The error signal is then applied to input terminal 46 of the chopper of zero comparator 24. Assuming the AC datum signal or waveform 70 to be, for instance, an audio or higher frequency signal, the line potential driving chopper coil 52 can be the usual 60 cycle voltage. Coil 52 can be driven at a multiple of the frequency of the fundamental or waveform 70 to lock the chopper comparison rate with the input frequency so that the two will not drift with respect to one another. On the other hand, the chopper drive frequency can be asynchronous with respect to the AC signal frequency: this will result in a time shift of the output wave-train which will not, however, mar the readability of the wave-train but actually improve the readability.

The other terminal 48 of the chopper is grounded; hence, as chopper armature 54 vibrates between alternate contacts with terminals 46 and 48, the output of the chopper will consist of alternate samplings of the error signal and ground, both referred to the bias on the grounded side of the limiting means. A typical waveform of the chopper output is shown in FIG. 5A the time axis being considerably shortened in comparison to the time axis in FIGS. 3 and 4. Reference has heretofore been made only to the portion of FIGS. 3, 4 and 5 marked A in which a typical AC datum signal is selected to have a peak value exactly equal to the DC reference level. As will be seen in FIG. 5A, the error signal portion of the wave-train forming the output of the chopper, exhibits peak values exactly level with the peak value of the ground potential sample. Referring to portions B of FIGS. 3 through 5, inclusive, it will be seen that other exemplary AC datum signal peaks are selected to be somewhat smaller than the DC reference level, and this difference appears quite clearly in the difference between the peak values of the error signal sample forming the waveform of FIG. 5B. Similarly the selected exemplary AC datum signal of FIG. 3C is somewhat larger in peak value than the reference level, and this difference is clearly reflected in the disparity of the appropriate portions of the waveform of FIG. 5.

The resolution of the device is enhanced by applying the chopper output waveform to the input of amplifier 56. The latter need only have a bandwidth large enough to insure passage of relatively sharply clipped wave peaks without significant amplitude error. The amplifier may have a variable gain or may exhibit a fixed overall gain, for instance, of about 30. The input resistor 60 to the amplifier is preferably of the same value as resistors 36 and 38, thus the overall attenuation of the signals introduced into amplifier stage 58 is a factor of 3. Assuming then a 3-to-1 attenuation, an overall amplifier gain of 30, and the exemplary values heretofore given of input voltages and of clipping levels, the output of amplifier 56 is therefore 10 times the limited sum of the signals applied to terminals 30 and 32, about 7 volts maximum at null.

To avoid overloading the read-out device, as well as to further increase resolutions, the amplifier output is, in turn, applied to second limiting means 28 in which diodes 66 and 68 clip the amplifier's output, for example, within 0.25 volt levels set by the forward conducting potential of the diodes which, in such case, are germanium. Limiting means 28, as previously explained in connection with limiting means 22, can be formed of but a single appropriately poled diode. The output of limiting means 28 is now available for application to the oscilloscope's input.

For a typical oscilloscope with 20 millivolts per centimeter sensitivity, and capable of accepting 250 millivolts without overload, sensitivity referred to the input of the device would then be 2 millivolts per centimeter. Thus, 400 microvolts will be readily discernible as 0.2 centimeter.

Hence, an error of 400 microvolts between two input levels of the device up to 20 volts is easily seen thus implying a resolution of 0.002%. It will be seen that the inclusion of an automatic zero reference provided by the chopper to the input of amplifier insures that any small offset in the latter will be eliminated as an error factor. Additionally, it will be noted that in view of the fact that the ultimate determination of error is based upon the equality or inequality of the peak amplitude of the clipped AC with reference to the automatic ground or zero reference line, the oscilloscope is not being used as a precise read-out but rather as a null device. Thus, oscilloscope drift and variations in oscilloscope gain have been eliminated as error factors. The waveforms shown in FIG. 5 have heretofore been described as illustrative of the output of chopper or zero comparator 24. These waveforms are also typical of the waveform of the output of the second limiting means made available for oscilloscope display, it being understood that the coaction of the amplifier and second limiter reduces the total amplitude of the waveforms while enhancing the disparity of any difference between the peak values of the waveform sections, as well as sharpening the spikes which are proportional to the peaks of the input AC waveform.

It will be noted that in FIG. 2, in the operation of the chopper or zero comparator 24, chopper armature 54 alternately connects between ground and the error signal. For the sake of convenience, terminal 48 is shown directly connected to ground. However, a resistance which is equal to one-half the value of either of resistors 36 or 38 can be inserted between terminal 48 and its connection to ground so that the chopper switches to ground through a one-half value resistor. Thus, any amplifier offset current feeding to input terminal 46 will generate the same offset voltage independently of chopper position. In other words, a resistive network is provided which shows the same impedance for the amplifier to look back into through the chopper. During the one-half cycle when the chopper is grounded through the one-half value resistor, diodes 42 and 44 function as a shunt to ground to insure that the impedance seen by the AC and DC sources will tend to stay constant.

Referring now to FIG. 6, there is shown a preferred embodiment of the present invention which includes a summer 130 adapted to accept a pair of input signals at a pair of its input terminals. One of the signals is a DC reference voltage and the other is the test signal. The summer 130 sums the two signals and provides an output to a limiter 132. Thus, it will be seen that the summer 130 and the limiter 132 are similar to the corresponding devices heretofore described with respect to FIG. 1. In the preferred embodiment of FIG. 6, however, only the AC components in the limited sum of the test and reference signals are applied to an amplifier 134. The output of the limiter 132 is programmed by a programmer 136 so that the limited sum is applied only periodically to the amplifier 134. Hence, the output of the amplifier 134 is an amplified version, in periodical form (i.e. samplings), of the limited sum. The amplifier's output is applied to a DC restorer 138 for inserting into the output a sampling of a fixed plane reference potential such as ground. The gating or timing of these samplings is controlled by the programmer 136.

Referring now to FIG. 7, there is shown a schematic circuit diagram of a comparator such as shown in FIG. 6. This circuit includes a pair of input terminals 140, 142 and a common terminal 144 connected to a fixed reference plane potential such as ground. The test or datum signal intended to be examined is applied, for example, between input terminal 140 and grounded terminal 144, while the precision DC reference signal is applied between the other input terminal 142 and terminal 144. These input terminals 140, 142 constitute the input terminals to the summer 130 which comprises, as in the embodiment of FIG. 2, a pair of resistors 146 and 148 respectively connected to terminals 140, 142 and to a summing junction 150.

The summing junction 150 is coupled to a limiter 132 which in the form shown comprises a pair of diodes 152 and 154 connected in parallel. The diodes are connected back-to-back between the summing junction 150 and ground. The summing junction 150 is also connected through a blocking capacitor 156 to the input of an amplifier 158 and is further connected through a first switching means 160 to ground. The output of amplifier 158 is connected through another coupling capacitor 162 to an output terminal 164. The output terminal 164 is also connected through a second switching means 166 to ground.

In the preferred mode of operation of FIG. 7, the first and second switching means 160 and 166 are mechanically ganged whereby both the summing junction 150 and the output terminal 164 become periodically and simultaneously connected to ground. It will be apparent that the limited sum of the datum and reference signals becomes applied to the blocking capacitor 156 whenever the switching means 160 is open circuited. Inversely, when the switching means 160 is closed, the output signal from the limiter 132 is grounded and no signal is applied to the amplifier 158. Thus, the periodic closing and opening of the switch 160 provides a series of samples of the limited sum appearing on the junction 150 to the input of the amplifier 158. The amplified samples of the limited sum is in turn applied through the coupling capacitor 162 to the output terminal 164. When switches 160 and 166 are closed, a sample of the ground potential appears on the output terminal 164. When switches 160 and 166 are open, a sample of the amplified limited sum appears on the output terminal 164. Hence, the output waveform on output terminal 164 consists of an alternating sequence of samples similar to that shown in FIG. 5.

While the operation of the DC restorer 138 and of the programmer 136 of FIG. 6 has been described in connection with a simple pair of ganged switching means, it will be apparent to those skilled in the art that equivalent devices capable of providing DC restoration may be used. For example, the desired introduction of the ground potential to the output terminal 164 may be achieved with the aid of known logic gates which become enabled and disabled by switching means.

Also, in the embodiments shown, the DC reference potential may be derived from a variety of sources, such as a stabilized-DC-reference circuit, a standard battery or the like. It will be apparent from the preceding decription that the peak values of the samples representing the waveform derived from the summed input signals deviate from, or show a disparity with respect to, the reference plane potential (i.e. ground) by an amount which is proportional to the difference between the peak value of the test or datum signal and the value of the reference signal.

Although preferred embodiments of this invention have been disclosed and described in great detail, it will be understood that modifications thereof may be made within the true spirit and scope of the invention as recited in the following claims.

What is claimed is:

1. A precision device for comparing a datum voltage signal with a DC reference voltage, said device comprising in combination:
    means for summing said datum and reference voltages,
    means for clipping the peak values of said summed voltages within predetermined limits on at least one side of a ground potential common to both of said voltages,
    means for periodically sampling the clipped summed voltages,
    means for amplifying the periodic samples of said clipped summed voltages,
    means for periodically sampling said ground potential, and
    means for alternating said periodic samplings of ground potential with the amplified periodic samples of said clipped summed voltages for forming a waveform in which the peak values of the portions of said waveform derived from said clipped sum deviate from the values of the portions of said waveform derived from said ground potential in proportion to the difference between the peak values of said datum signal voltages and said reference voltage.

2. A precision device as claimed in 1, wherein said means for sampling said clipped summed voltages comprises a first switching means for alternately connecting and disconnecting the output of said clipping means with the input of said amplifying means, said means for sampling said ground potential comprises a second switching means for alternately connecting and disconnecting the output of said amplifying means with ground potential, said first and second switching means being synchronized for alternately sampling said clipped sum and said ground potential.

3. A precision device for comparing a datum voltage signal with a DC reference voltage, said devices comprising in combination:
    a resistive network for summing said datum and reference voltages at a summing junction,
    a diode limiter connected between said summing junction and a ground potential common to both of said voltages for clipping the peaked values of the summed voltages within predetermined limits on at least one side of said ground potential,
    switching means having a pair of input terminals respectively connected to said summing junction and to said ground,
    an amplifier for alternately taking samples of the clipped summed voltages and said ground potential for providing a periodic signal therefrom,
    amplifying means connected to accept said periodic signal from said switching means for increasing the resolution between the value of said ground potential and the peak values of said summed voltages in said periodic signal.

4. A precision device for comparing an alternating datum voltage signal with a DC reference voltage, said device comprising in combination:
    a respective network for forming said datum and reference voltages at a summing junction,
    a diode limiter connected between said summing junction and a ground potential common to both of said voltages for clipping the peaked values of the summed voltages within predetermined limits on at least one side of said ground potential,
    first switching means alternately connectable and disconnectable to said summing junction for periodically sampling the clipped summed voltages,
    an amplifier for amplifying the periodic samples of said clipped summed voltages,
    second switching means connectable and disconnectable to said ground potential for periodically sampling the latter and for applying the samples of said latter to the output of said amplifier, and
    a programmer connected to said first and second switching means for alternating said periodic samplings of ground potential with the amplified periodic samples of said clipped summed voltages in order to form a waveform therefrom.

References Cited

UNITED STATES PATENTS 3,070,786   12/1962   MacIntyre  ---------- 330—9 X
3,304,507   2/1967   Weekes et al.  -------- 328—151

JOHN S. HEYMAN, *Primary Examiner.*

Disclaimer and Dedication 3,376,513.—*Peter L. Richman*, Lexington, Mass. HIGH PRECISION COMPARATOR DEVICE. Patent dated Apr. 2, 1968. Disclaimer and dedication filed Mar. 17, 1971, by the assignee, *Weston Instruments, Inc.*

Hereby enters this disclaimer to the remaining term of said patent and dedicates said patent to the Public.

[*Official Gazette April 27, 1971.*]